(12) United States Patent
Yoshida

(10) Patent No.: US 10,038,837 B2
(45) Date of Patent: Jul. 31, 2018

(54) IMAGING DEVICE AND WATER DROPLET ADHESION DETERMINING METHOD

(71) Applicant: JVC KENWOOD Corporation, Yokohama-shi, Kanagawa (JP)

(72) Inventor: Satoru Yoshida, Yokohama (JP)

(73) Assignee: JVC Kenwood Corporation, Yokohama (JP)

(*) Notice: Subject to any disclaimer, the term of this patent is extended or adjusted under 35 U.S.C. 154(b) by 253 days.

(21) Appl. No.: 14/967,828

(22) Filed: Dec. 14, 2015

(65) Prior Publication Data

US 2016/0100102 A1 Apr. 7, 2016

Related U.S. Application Data

(63) Continuation of application No. PCT/JP2014/065199, filed on Jun. 9, 2014.

(30) Foreign Application Priority Data

Jul. 29, 2013 (JP) ................................. 2013-156442
Jan. 27, 2014 (JP) ................................. 2014-012248

(51) Int. Cl.
*G06K 9/62* (2006.01)
*H04N 5/232* (2006.01)
*G03B 11/04* (2006.01)
*G02B 27/00* (2006.01)
*H04N 5/225* (2006.01)
*H04N 5/217* (2011.01)
*G03B 17/08* (2006.01)

(52) U.S. Cl.
CPC ..... *H04N 5/23222* (2013.01); *G02B 27/0006* (2013.01); *G03B 11/048* (2013.01);
(Continued)

(58) Field of Classification Search
CPC .. G02B 27/0006; G03B 11/048; G03B 17/08; G06K 9/6201; H04N 5/2171;
(Continued)

(56) References Cited

U.S. PATENT DOCUMENTS 5,623,479 A * 4/1997 Takahashi ........ G06K 19/06046
369/275.5
5,865,865 A * 2/1999 Yoshida .................. C03C 15/00
427/109
(Continued)

FOREIGN PATENT DOCUMENTS

JP 02281132 A 11/1990
JP 87332 A 1/1996
(Continued)

OTHER PUBLICATIONS

Hara et al, Removal of Glare Caused by Water Droplets, 2009.*
International Search Report dated Aug. 12, 2014 corresponding to International Application No. PCT/JP2014/065199.

*Primary Examiner* — Shan E Elahi
(74) *Attorney, Agent, or Firm* — Nath, Goldberg & Meyer; Jerald L. Meyer

(57) ABSTRACT

An image signal evaluator calculates a first image signal evaluation value based on an image signal captured in a state where a focusing position is adjusted to an imaging target. A water droplet adhesion determiner determines whether there is a possibility that a water droplet may be adhered onto an imaging window by comparing a first image signal evaluation value and a threshold value. In a case where it is determined that there is the possibility, an image signal evaluator calculates a second image signal evaluation value based on an image signal captured in a state where the focusing position is adjusted to a position of a close distance. The water droplet adhesion determiner determines whether a water droplet is adhered onto the imaging window by comparing the first image signal evaluation value and the second image signal evaluation value.

3 Claims, 3 Drawing Sheets

(52) U.S. Cl.
CPC ......... *G06K 9/6201* (2013.01); *H04N 5/2171* (2013.01); *H04N 5/2257* (2013.01); *H04N 5/232* (2013.01); *H04N 5/23212* (2013.01); *G03B 17/08* (2013.01)

(58) Field of Classification Search
CPC .. H04N 5/2257; H04N 5/232; H04N 5/23212; H04N 5/23222
USPC ........................................................ 348/148
See application file for complete search history.

(56) References Cited

U.S. PATENT DOCUMENTS

| | | | | |
|---|---|---|---|---|
| 2006/0044458 | A1* | 3/2006 | Kato | H04N 5/238 348/360 |
| 2008/0112050 | A1* | 5/2008 | Nomura | G02B 1/105 359/507 |
| 2008/0285132 | A1* | 11/2008 | O'Kane | G02B 27/0006 359/509 |
| 2012/0062163 | A1* | 3/2012 | Morishita | B60S 1/0833 318/483 |
| 2018/0086309 | A1* | 3/2018 | Kono | G01N 21/958 |

FOREIGN PATENT DOCUMENTS

| | | | |
|---|---|---|---|
| JP | 2005077687 | A | 3/2005 |
| JP | 2009271428 | A | 11/2009 |
| JP | 2010081273 | A | 4/2010 |
| JP | 2012065191 | A | 3/2012 |

* cited by examiner

IMAGING DEVICE AND WATER DROPLET ADHESION DETERMINING METHOD

CROSS REFERENCE TO RELATED APPLICATION

This application is a Continuation of PCT Application No. PCT/JP2014/065199, filed on Jun. 9, 2014, and claims the priority of Japanese Patent Application No. 2013-156442, filed on Jul. 29, 2013, and Japanese Patent Application No. 2014-012248, filed on Jan. 27, 2014, the entire contents of all of which are incorporated herein by reference.

BACKGROUND

The present disclosure relates to an imaging device and a water droplet adhesion determining method.

Japanese Unexamined Patent Application Publication No. 2005-77687 (Patent Document 1) describes an imaging device including a water droplet sensor, and removing of a water droplet, which is adhered onto the surface of a lens, by application of vibrations upon detecting that a water droplet is adhered onto the imaging device by the water droplet sensor.

SUMMARY

Since the imaging device described in Patent Document 1 includes the water droplet sensor, the scale or the cost of the imaging device increases.

A first aspect of the embodiments provides an imaging device including: an imaging unit configured to capture an imaging target via an imaging window; a focusing position controller configured to control a focusing position of the imaging unit to at least two positions including a position of the imaging target and a position of a close distance; an image signal evaluator configured to evaluate an image signal outputted from the imaging unit, and to calculate an image signal evaluation value; an evaluation value storage unit configured to store the image signal evaluation value calculated by the image signal evaluator; a water droplet adhesion determiner configured to determine whether or not a water droplet is adhered onto the imaging window in response to the image signal evaluation value; and a water droplet remover configured to remove the water droplet of the imaging window, wherein the image signal evaluator is configured to calculate, as a first image signal evaluation value, an image signal evaluation value that is based on an image signal captured in a state where the focusing position of the imaging unit is adjusted to the imaging target, the water droplet adhesion determiner is configured to determine as a first determination whether or not there is a possibility that a water droplet may be adhered onto the imaging window by comparing the first image signal evaluation value and a predetermined threshold value with each other, in a case where the water droplet adhesion determiner determines that there is a possibility that a water droplet may be adhered by the first-order determination, the image signal evaluator is configured to calculate, as a second image signal evaluation value, an image signal evaluation value that is based on an image signal captured in a state where the focusing position of the imaging unit is moved to the position of the close distance, the water droplet adhesion determiner is configured to determine as a second determination whether or not a water droplet is adhered onto the imaging window by comparing the first image signal evaluation value and the second image signal evaluation value with each other, and the water droplet remover is configured to remove the water droplet on the imaging window in a case where the water droplet adhesion determiner determines that a water droplet is adhered by the second determination.

A second aspect of the embodiments provides a water droplet adhesion determining method including: capturing a first image by an imaging unit in a state where a focusing position of the imaging unit is adjusted to an imaging target via an imaging window; evaluating a first image signal that is based on the first image, and calculating a first image signal evaluation value; determining, as a first determination, whether or not there is a possibility that a water droplet may be adhered onto the imaging window by comparing the first image signal evaluation value and a predetermined threshold value with each other; adjusting the focusing position of the imaging unit to a position of a close distance in a case where it is determined that there is a possibility that a water droplet may be adhered by the primary determination; capturing a second image by the imaging unit in a state where the imaging unit adjusts the focusing position to the position of the close distance; evaluating a second image signal that is based on the second image, and calculating a second image signal evaluation value; and determining, as a second determination, whether or not a water droplet is adhered onto the imaging window by comparing the first image signal evaluation value and the second image signal evaluation value with each other.

DETAILED DESCRIPTION

Figure 1:
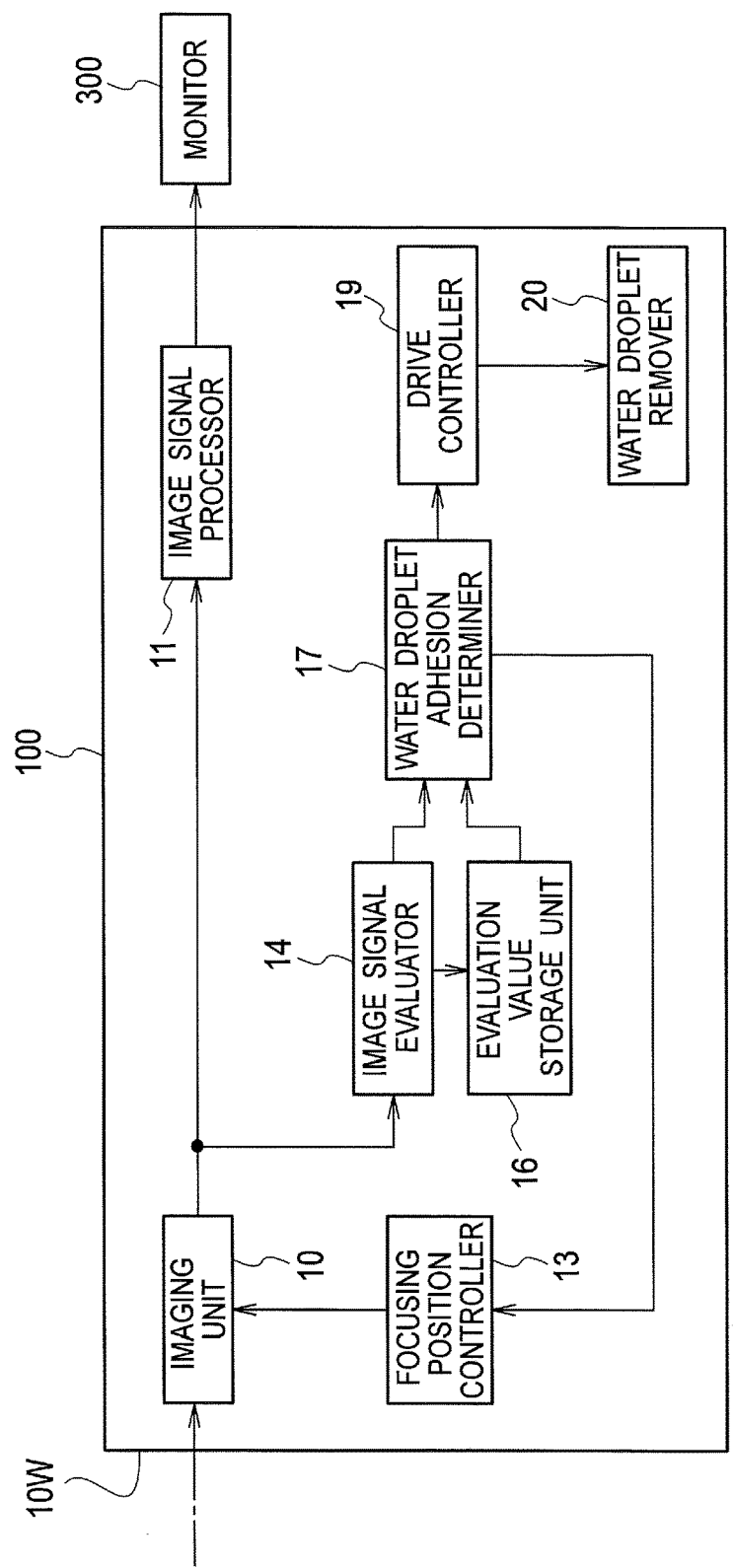
FIG. 1 is a block diagram showing a configuration of a monitoring system including an imaging device according to at least one embodiment.

First, a description is made of an imaging device according to the embodiment by using FIG. 1. The imaging device according to the embodiment executes processing by the water droplet adhesion determining method according to the first or second embodiment to be described later.

A monitoring system shown in FIG. 1 includes: an imaging device 100; and a monitor 300 that displays an image captured by the imaging device 100.

The imaging device 100 includes: an imaging unit 10; an image signal processor 11; a focusing position controller 13; an image signal evaluator 14; an evaluation value storage unit 16; a water droplet adhesion determiner 17; a drive controller 19; and a water droplet remover 20.

The imaging unit 10 captures an imaging target via an imaging window 10W, which is provided in a housing in which the imaging device 100 is housed, and acquires an image signal. The imaging unit 10 captures the imaging target in a predetermined cycle that is preset.

In a case where the imaging device 100 is a so-called dome camera installed on a ceiling of a room, the imaging window 10W is a dome cover that houses the imaging device 100 therein. The dome cover of the dome camera functions as an optical member.

The imaging unit 10 is configured so that, under control of the focusing position controller 13, a movement of an imaging lens (not shown) can be controlled to make it possible to change a focusing position of the imaging lens. At a time of general operation, the focusing position of the imaging unit 10 is adjusted to the imaging target that is going to be captured by the imaging device 100. A variable range of the focusing position of the imaging unit 10 is determined in response to the specifications of the imaging lens. Typically, the closest distance of the focusing position is, for example, roughly several centimeters in front of the imaging lens.

Hence, the focusing position of the imaging unit 10 is forcibly set at a close distance, whereby the imaging unit 10 can focus at a position close to the imaging window 10W. The close distance is set based on the closest distance.

The imaging unit 10 supplies the captured image signal to the image signal processor 11 and the image signal evaluator 14.

The image signal processor 11 converts the image signal, which is outputted from the imaging unit 10, into an image signal with a predetermined format, and supplies the converted image signal to the monitor 300. The monitor 300 is, for example, a liquid crystal monitor, and displays an image that is based on the image signal outputted from the image signal processor 11.

The focusing position controller 13 controls the focusing position of the imaging unit 10. The focusing position controller 13 stores, as preset positions of the focusing position, at least two pieces of position information including a position of the imaging target and the position of a close distance.

The focusing position is set to be a position of the imaging target when the imaging device 100 is installed, and the focusing position controller 13 stores the preset positions of the imaging target.

The focusing position may be set so as to be a position close to the imaging window 10W when the imaging device 100 is installed, and the focusing position controller 13 may store a preset position of a close distance, or alternatively, the focusing position controller 13 may store a position of the closest distance according to specifications of the imaging lens as a preset position of a close distance.

The focusing position controller 13 switches the focusing position of the imaging unit 10 to either of the position of the imaging target or the position of the close distance by the control made by the water droplet adhesion determiner 17.

The focusing position controller 13 may include an automatic focusing function. The focusing position controller 13 may be configured to focus on the imaging target automatically, and to forcibly focus in the preset position of the close distance or in the position of the closest distance according to an instruction issued from the water droplet adhesion determiner 17.

The image signal evaluator 14 evaluates either one or both of the contrast and focusing degree of the image signal outputted from the imaging unit 10, and calculates an image signal evaluation value.

Specifically, the image signal evaluator 14 creates a histogram of brightness values of the image signal and the number of pixels thereof, and obtains a distribution of the brightness values. Based on the histogram, the image signal evaluator 14 calculates a standard deviation of the brightness values by an arithmetic operation, and defines the calculated standard deviation as a contrast evaluation value.

Moreover, the image signal evaluator 14 calculates an integrated value of AC components of the image signal, and defines the calculated integrated value as a focusing degree evaluation value of the image signal.

Calculation methods of the contrast evaluation value and the focusing degree evaluation value are not limited to the above-described methods. For example, a difference between the maximum value and minimum value of the brightness values of the image signal may be calculated, and the calculated difference may be defined as the contrast evaluation value.

For example, a maximum value of the AC components of the image signal may be defined, and the calculated maximum value may be defined as the focusing degree evaluation value.

Such a method using the values of the AC components of the image signal as the evaluation value of the focusing degree has been conventionally used, for example, for a camera and the like, which perform an automatic focusing adjustment.

The image signal evaluator 14 supplies the calculated image signal evaluation value to the evaluation value storage unit 16 and the water droplet adhesion determiner 17.

The evaluation value storage unit 16 is composed of, for example, a flash memory, and stores the image signal evaluation value outputted from the image signal evaluator 14. The image signal evaluation value stored in the evaluation value storage unit 16 is read when the water droplet adhesion determiner 17 determines the water droplet adhesion, and is supplied to the water droplet adhesion determiner 17. At the time when the image signal evaluation value is supplied to the water droplet adhesion determiner 17, a newly calculated image signal evaluation value is overwritten into the evaluation value storage unit 16, and the stored data is updated.

Based on an image signal evaluation value of the latest image signal, which is outputted from the image signal evaluator 14, and on an image signal evaluation value of the previous image signal, which is read from the evaluation value storage unit 16, the water droplet adhesion determiner 17 determines whether or not a water droplet is adhered onto the imaging window 10W by a method to be described later.

Based on the result of such a determination, the water droplet adhesion determiner 17 instructs the focusing position controller 13 to switch the focusing position, and instructs the drive controller 19 to drive the water droplet remover 20.

The drive controller 19 controls the drive of the water droplet remover 20 based on the instruction issued by the water droplet adhesion determiner 17.

The water droplet remover 20 includes, for example, a wiper as a water droplet removal unit, and drives the wiper to remove the water droplet, which is adhered onto the imaging window 10W, based on the control made by the drive controller 19. The water droplet removal unit is not limited to the wiper, and for example, may be a method of blowing compressed air onto the imaging window 10W.

Such constituents in the imaging device 100, which exclude the imaging unit 10 and the water droplet remover 20, can be composed, for example, of a microcomputer that controls a variety of operation processing in accordance with a computer program.

The imaging device according to the embodiment can accurately determine whether or not a water droplet is adhered onto the imaging window, while suppressing increase of the scale or the cost of the imaging device.

First Embodiment

Figure 2:
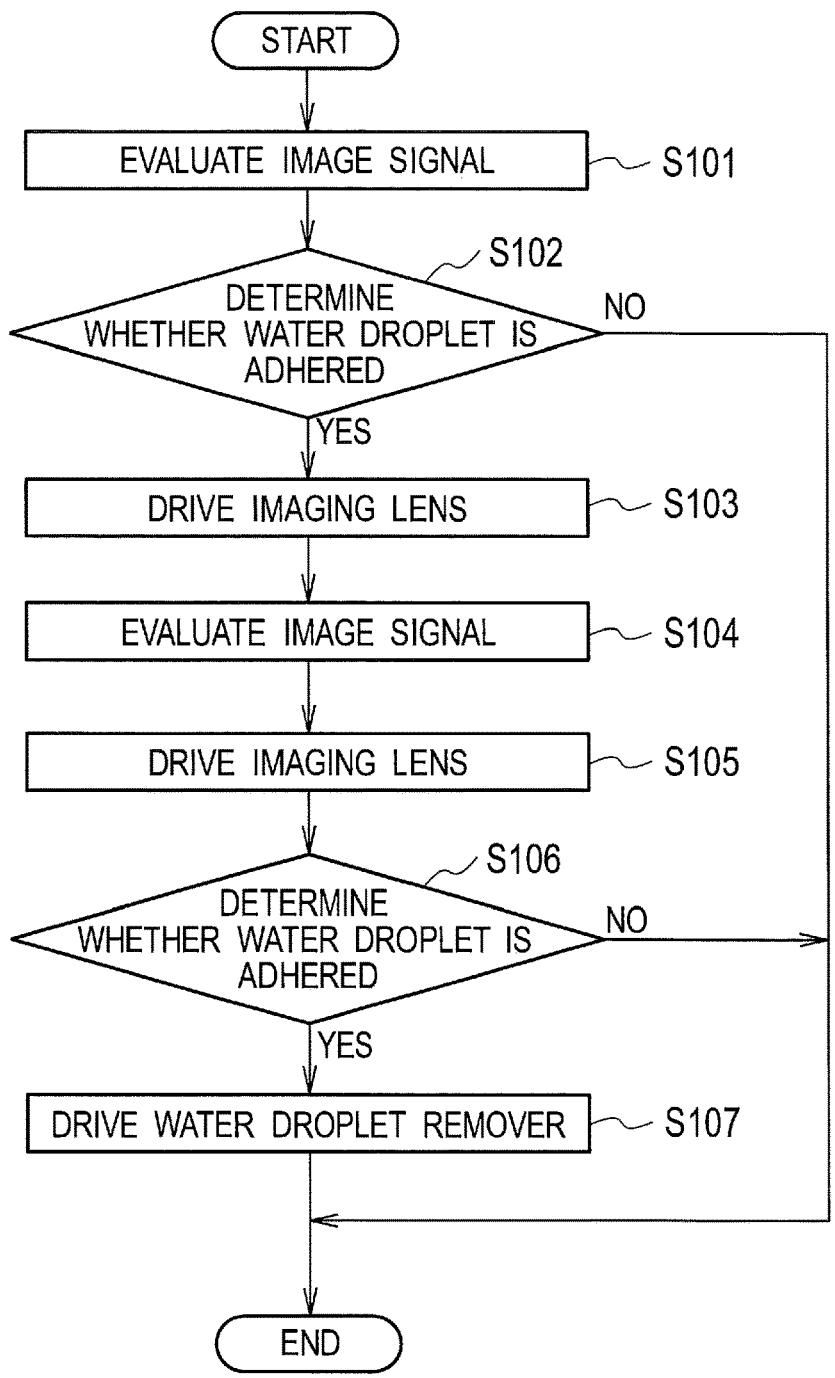
FIG. 2 is a flowchart showing a processing procedure of a water droplet adhesion determining method according to the first embodiment.

A description is made of processing of the water droplet adhesion determining method according to the first embodiment by using the flowchart shown in FIG. 2.

In step S101, the image signal evaluator 14 calculates the image signal evaluation value in a state where the focusing position of the imaging unit 10 is adjusted to the imaging target. The image signal evaluation value is either one or both of the contrast evaluation value (referred to as a contrast evaluation value CA) and the focusing degree evaluation value (referred to as a focusing degree evaluation value FA).

It is preset in advance which of the image signal evaluation values is to be calculated in response to the image signal evaluation value(s) for use in determinations in step S102 and step S106.

The calculated image signal evaluation value is supplied to the evaluation value storage unit 16, and the evaluation value storage unit 16 stores the image signal evaluation value inputted thereto. At the same time, the calculated image signal evaluation value is supplied to the water droplet adhesion determiner 17.

In step S102, the water droplet adhesion determiner 17 determines whether or not there is a possibility that a water droplet may be adhered onto the imaging window 10W based on the image signal evaluation value calculated in step S101.

When a water droplet is adhered onto the imaging window 10W in the state where the focusing position is adjusted to the imaging target, incident light from the imaging window 10W is scattered by the water droplet, and a flare appears where the entire image becomes whitish.

Adhesion of a water droplet onto the imaging window 10W narrows the distribution of the brightness values of the image signal in comparison with the state where a water droplet is not adhered onto the imaging window 10W. The standard deviation of the brightness values is reduced, whereby the contrast evaluation value is reduced.

Moreover, when a water droplet is adhered onto the imaging window 10W in the state where the focusing position of the imaging unit 10 is adjusted to the imaging target, the captured image is blurred due to the influence of the adhered water droplet, and accordingly, the focusing degree evaluation value is reduced in comparison with the state where a water droplet is not adhered onto the imaging window 10W.

Hence, in a case where the contrast evaluation value CA is smaller than a first threshold value that is preset, or in a case where the focusing degree evaluation value FA is smaller than a second threshold value that is preset, the water droplet adhesion determiner 17 determines that there is a possibility that a water droplet may be adhered.

In a case of using both of the contrast evaluation value CA and the focusing degree evaluation value FA as the image signal evaluation values, it is preferable to determine that there is a possibility that a water droplet may be adhered in a case where both of the image signal evaluation values are smaller than the respective threshold values.

An erroneous determination can be reduced by making the above-described determination by both of the contrast evaluation value CA and the focusing degree evaluation value FA.

In a case where it is determined in step S102 that there is a possibility that a water droplet may be adhered (YES), the water droplet adhesion determiner 17 shifts the processing to step S103. In a case where it is not determined in step S102 that there is a possibility that a water droplet may be adhered (NO), the water droplet adhesion determiner 17 ends the processing.

In step S103, the water droplet adhesion determiner 17 instructs the focusing position controller 13 to adjust the focusing position of the imaging unit 10 to the close distance. The focusing position controller 13 moves the imaging lens of the imaging unit 10 and adjusts the focusing position to the close distance.

In step S104, in the state where the focusing position of the imaging unit 10 is adjusted to the close distance, the image signal evaluator 14 calculates either one or both of the contrast evaluation value (referred to as a contrast evaluation value CB) of the captured image and the focusing degree evaluation value (referred to as a focusing degree evaluation value FB) thereof.

It is preset in advance which of the image signal evaluation values is to be calculated in response to the image signal evaluation value(s) for use in determinations in step S106. The calculated image signal evaluation value is supplied to the evaluation value storage unit 16 and the water droplet adhesion determiner 17.

In step S105, the water droplet adhesion determiner 17 instructs the focusing position controller 13 to adjust the focusing position of the imaging unit 10 to the imaging target. The focusing position controller 13 moves the imaging lens of the imaging unit 10 and adjusts the focusing position to the imaging target.

Several frame periods are sufficient as the time from when the focusing position is adjusted to the close distance in step S103 to the time when the focusing position is returned to the imaging target in step S105.

The image of the imaging target is blurred during the period which the focusing position is set to the close distance; however, a water droplet is adhered onto the imaging window 10W in this period, and accordingly, the captured image is less affected.

In step S106, the water droplet adhesion determiner 17 compares the image signal evaluation value, which is calculated in step S101, and the image signal evaluation value, which is calculated in step S104, with each other, and determines whether or not a water droplet is adhered.

In the state where a water droplet is adhered onto the imaging window 10W, the contrast evaluation value in the case where the focusing position is set to the close distance increases in comparison with that of the case where the focusing position of the imaging unit 10 is adjusted to the imaging target.

Moreover, in the state where a water droplet is adhered onto the imaging window 10W, the focusing degree evaluation value in the case where the focusing position is set to the close distance increases in comparison with that of the case where the focusing position of the imaging unit 10 is adjusted to the imaging target. This is because the water droplet of the imaging window 10W is focused or approximately focused by setting the focusing position to the close distance.

Hence, the water droplet adhesion determiner 17 determines that a water droplet is adhered onto the imaging window 10W in a case where the contrast evaluation value CB is larger than the contrast evaluation value CA, or in a case where the focusing degree evaluation value FB is larger than the focusing degree evaluation value FA.

In a case of using both of the contrast evaluation value and the focusing degree evaluation value as the image signal evaluation values, it is preferable to determine that a water droplet is adhered in the case where the contrast evaluation value CB is larger than the contrast evaluation value CA, and in the case where the focusing degree evaluation value FB is larger than the focusing degree evaluation value FA.

The erroneous determination can be reduced by determining that the water droplet is adhered by both of the contrast evaluation values and the focusing degree evaluation values.

In a case where it is determined in step S106 that a water droplet is adhered (YES), the water droplet adhesion determiner 17 shifts the processing to step S107. In a case where it is determined in step S106 that a water droplet is not adhered (NO), the water droplet adhesion determiner 17 ends the processing.

In step S107, the drive controller 19 receives the instruction of the water droplet adhesion determiner 17, and controls the drive of the water droplet remover 20. The water droplet remover 20 drives the water droplet removal unit to remove the water droplet adhered onto the imaging window 10W. The drive controller 19 drives the water droplet removal unit in the water droplet remover 20 a predetermined number of times or for a predetermined time, and then stops the water droplet removal unit, and ends the processing.

In the first embodiment, the water droplet adhesion determiner 17 determines the contrast evaluation value or focusing degree evaluation value of the image which the imaging unit 10 acquires while adjusting the focusing position to the imaging target, and determines whether or not there is a possibility that a water droplet may be adhered onto the imaging window 10W.

In the case where it is determined that there is a possibility that a water droplet may be adhered, the imaging unit 10 captures and acquires the image while adjusting the focusing position to the close distance.

The water droplet adhesion determiner 17 compares the contrast evaluation values or the focusing degree evaluation values between the image in the state where the focusing position is adjusted to the imaging target and the image in the state where the focusing position is adjusted to the close distance, and determines whether or not a water droplet is adhered.

The first embodiment executes such double determination processing including a first determination and a second determination as described above, and can thereby enhance detection accuracy for the adhesion of a water droplet.

The detection accuracy for the adhesion of the water droplet can be enhanced, and accordingly, an unnecessary drive of the water droplet remover 20 is avoided, and the water droplet remover 20 can be driven appropriately. As a result, pointless operation of the water droplet remover 20, in cases where there is no water droplet adhered, is avoided.

In particular, in a case of adopting a wiper as the water droplet removal unit, if the wiper is driven in the state where a water droplet is not adhered, then there occurs a defect in that the imaging window 10W is scratched or the wiper itself is degraded, and accordingly, the advantage by the first embodiment is great.

According to the first embodiment, it can be determined whether or not a water droplet is adhered by using the configuration, which the imaging device usually includes, without using such a water droplet sensor as disclosed in Patent Document 1. Therefore, an adhesion of the water droplet onto the imaging window 10W can be accurately detected while suppressing the increase of the size or the cost of the imaging device.

Second Embodiment

Figure 3:
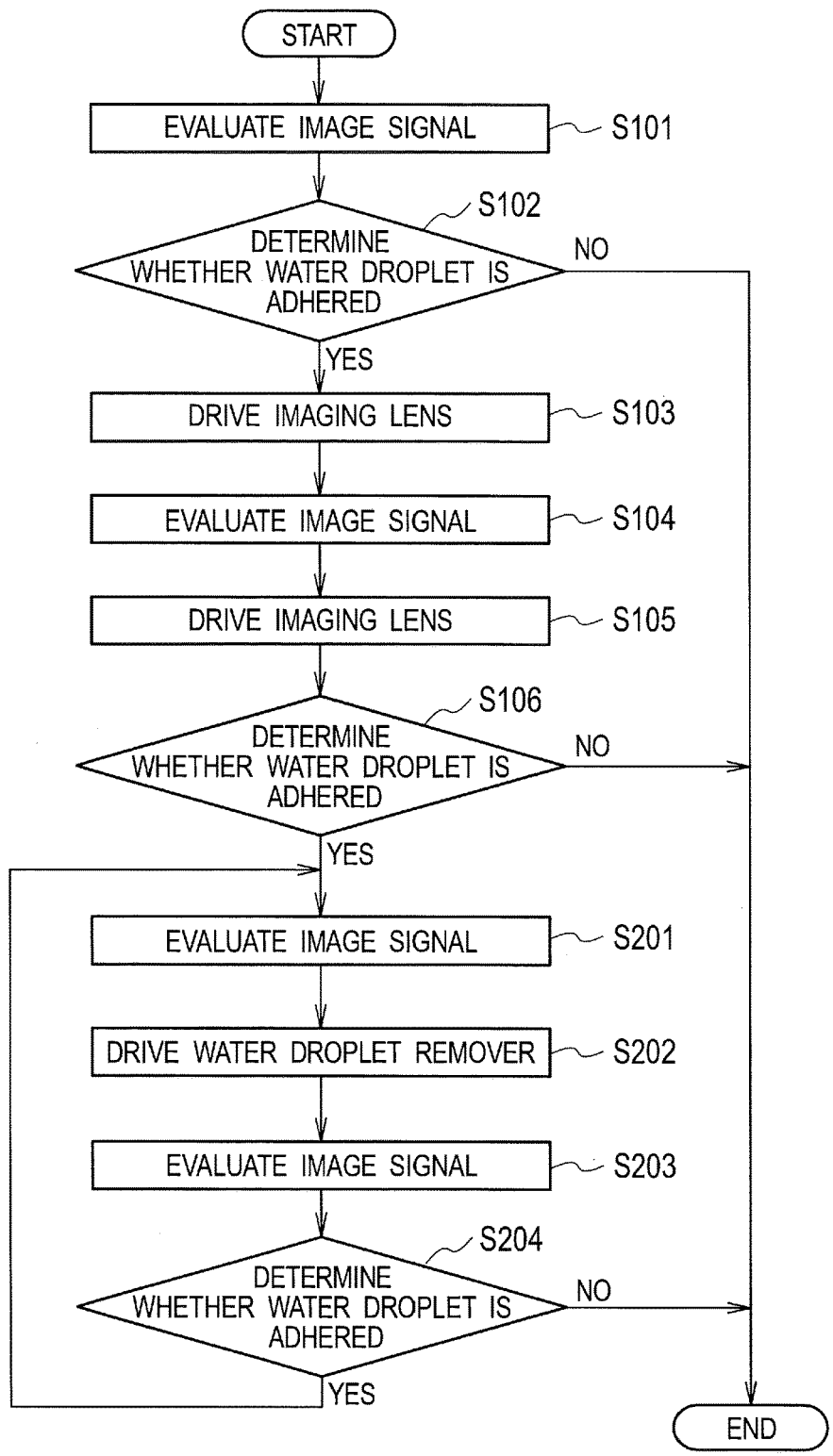
FIG. 3 is a flowchart showing a processing procedure of a water droplet adhesion determining method according to the second embodiment.

The water droplet adhesion determining method according to the second embodiment, which is shown in FIG. 3, adds a repeating loop of evaluation of the image signal, the removal of the water droplet and the determination whether or not a water droplet is adhered, to the water droplet adhesion determining method according to the first embodiment. In the description of the second embodiment, a description of portions common to those in the description of the first embodiment may be omitted.

In the flowchart shown in FIG. 3, processing from step S101 to S106 are the same as the processing described in FIG. 2.

In FIG. 3, in step S201, the image signal evaluator 14 calculates the image signal evaluation value in a state where the focusing position of the imaging unit 10 is adjusted to the imaging target. The image signal evaluation value is either one or both of the contrast evaluation value (referred to as a contrast evaluation value CC) and the focusing degree evaluation value (referred to as a focusing degree evaluation value FC).

It is preset in advance which of the image signal evaluation values is to be calculated in response to the image signal evaluation value(s) for use in determinations in step S204. The calculated image signal evaluation value is supplied to the evaluation value storage unit 16, and the evaluation value storage unit 16 stores the image signal evaluation value inputted thereto.

In step S202, the drive controller 19 receives the instruction of the water droplet adhesion determiner 17, and controls the drive of the water droplet remover 20. The water droplet remover 20 drives the water droplet removal unit to remove the water droplet adhered onto the imaging window 10W. The drive controller 19 drives the water droplet removal unit in the water droplet remover 20 a predetermined number of times or for a predetermined time, and then stops the water droplet removal unit, and shifts the processing to step S203.

In step S203, the image signal evaluator 14 calculates the image signal evaluation value in the state where the focusing position of the imaging unit 10 is adjusted to the imaging target. The image signal evaluation value is either one or both of the contrast evaluation value (referred to as a contrast evaluation value CD) and the focusing degree evaluation value (referred to as a focusing degree evaluation value FD).

It is preset in advance which of the image signal evaluation values is to be calculated in response to the image signal evaluation value(s) for use in determinations in step S204. The calculated image signal evaluation value is supplied to the water droplet adhesion determiner 17.

In step S204, the water droplet adhesion determiner 17 compares the image signal evaluation values before and after the water droplet remover 20 is driven, and determines whether or not a water droplet is adhered.

As described in the first embodiment, when a water droplet is adhered onto the imaging window 10W in the state where the focusing position of the imaging unit 10 is adjusted to the imaging target, the contrast evaluation value and the focusing degree evaluation value are reduced in comparison with the state where a water droplet is not adhered onto the imaging window 10W.

The water droplet adhesion determiner 17 determines that a water droplet is adhered before the operation of the water droplet remover 20 and that the water droplet is removed by the operation of the water droplet remover 20 in a case where the contrast evaluation value CD is larger than the contrast evaluation value CC, or in a case where the focusing degree evaluation value FD is larger than the focusing degree evaluation value FC.

In the determination of step S204, it is sufficient to compare either one of the contrast evaluation value or the focusing degree evaluation value and determine whether or not a water droplet is adhered.

In an event of the comparison between the image signal evaluation values, a predetermined threshold value may be set. In this case, the water droplet adhesion determiner 17 may determine that a water droplet is adhered before the operation of the water droplet remover 20 and that the water droplet is removed by the operation of the water droplet remover 20 in a case where the contrast evaluation value CD is larger than the contrast evaluation value CC by a first threshold value or more.

The water droplet adhesion determiner 17 may determine that a water droplet is adhered before the operation of the water droplet remover 20 and that the water droplet is removed by the operation of the water droplet remover 20 in a case where the focusing degree evaluation value FD is larger than the focusing degree evaluation value FC by a second threshold value or more.

The erroneous determination can be reduced by setting the threshold values for the determination.

The water droplet adhesion determiner 17 may determine that a water droplet is adhered before the operation of the water droplet remover 20 and that the water droplet is removed by the operation of the water droplet remover 20 in a case where the contrast evaluation value CD is larger than the contrast evaluation value CC by the first predetermined threshold value or more and where the focusing degree evaluation value FD is larger than the focusing degree evaluation value by a second threshold value or more.

In a case where it is determined in step S204 that a water droplet is adhered (YES), there is a possibility that a water droplet continues to be adhered because it continues to rain and so on, and accordingly, the water droplet adhesion determiner 17 returns the processing to step S201. The loop from step S201 to step S204 is repeated until it is not determined in step S204 that a water droplet is adhered (NO).

In a case where it is not determined in step S204 that a water droplet is adhered (NO), the water droplet adhesion determiner 17 determines that a water droplet is not be adhered because it has stopped raining and so on, and thus ends the processing.

In the second embodiment, the following advantage is present in addition to the advantage of the first embodiment. According to the second embodiment, after it is determined once that a water droplet is adhered and the water droplet remover 20 is driven, it is determined whether or not a water droplet is adhered without changing the focusing position of the imaging unit 10, and accordingly, it can be appropriately determined whether or not a water droplet is adhered while clearly capturing the imaging target.

The present invention is not limited to the embodiments described above, and is changeable in various ways within the scope without departing from the scope of the present invention. In the configuration shown in FIG. 1, the use of hardware or software is optional.

What is claimed is:

1. An imaging device comprising:
   an imaging unit configured to capture an imaging target via an imaging window;
   a focusing position controller configured to control a focusing position of the imaging unit to at least two positions including a position of the imaging target and a position of a close distance;
   an image signal evaluator configured to evaluate an image signal outputted from the imaging unit, and to calculate an image signal evaluation value;
   an evaluation value storage unit configured to store the image signal evaluation value calculated by the image signal evaluator;
   a water droplet adhesion determiner configured to determine whether or not a water droplet is adhering onto the imaging window in response to the image signal evaluation value; and
   a water droplet remover configured to remove the water droplet of the imaging window, wherein
   the image signal evaluator is configured to calculate, as the image signal evaluation value, a first contrast evaluation value, obtained by evaluating a contrast of the image signal, and a first focusing degree evaluation value, obtained by evaluating a focusing degree in the imaging unit based on the image signal, in a state where the focusing position of the imaging unit is adjusted to the imaging target,
   the water droplet adhesion determiner is configured to determine that, as a first determination, there is a possibility that a water droplet may be adhering onto the imaging window, in a case where the first contrast evaluation value is smaller than a first threshold value, and the first focusing degree evaluation value is smaller than a second threshold value,
   in a case where the water droplet adhesion determiner determines that there is a possibility that a water droplet may be adhering by the first determination, the image signal evaluator is configured to calculate, as the image signal evaluation value, a second contrast evaluation value, obtained by evaluating a contrast of the image signal, and a second focusing degree evaluation value, obtained b evaluating a focusing degree in the imaging unit based on the image signal, in a state where the focusing position of the imaging unit is moved to the position of the close distance,
   the water droplet adhesion determiner is configured to determine that, as a second determination, a water droplet is adhering onto the imaging window, in a case where the second contrast evaluation value is larger than the first contrast evaluation value, and the second focusing degree evaluation value is larger than the first focusing degree evaluation value, and
   the water droplet remover is configured to operate to remove the water droplet on the imaging window in a case where the water droplet adhesion determiner determines that a water droplet is adhering by the second determination.

2. The imaging device according to claim 1, wherein the water droplet adhesion determiner is configured to determine that, as a third determination, a water droplet is not adhering in a case where a fourth contrast evaluation value is larger than a third contrast evaluation value, or a fourth focusing degree evaluation value is larger than a third focusing degree evaluation value, the third contrast evaluation value and the third focusing degree evaluation value being respectively the first contrast evaluation value and the first focusing degree evaluation value, before the water droplet remover operates to remove the water droplet on the imaging window, and the fourth contrast evaluation value and the fourth focusing degree evaluation value being respectively the first contrast evaluation value and the first focusing degree evaluation value, after the water droplet remover operates to remove the water droplet on the imaging window, the water droplet remover is configured to operate to remove the water droplet of the imaging window in a case where the water droplet adhesion determiner does not determine that a water droplet is not adhering by the third determination, the water droplet adhesion determiner is further configured to repeat the third determination until the water droplet adhesion determiner determines that a water droplet is not adhering, and the water droplet remover is configured to stop an operation of removing a water droplet in a case where the water droplet adhesion determiner determines that a water droplet is not adhering by the third determination.

3. A water droplet adhesion determining method comprising:

using a focusing position controller to adjust a focusing position of an imaging unit to a position of an imaging target;

using the imaging unit to capture a first image in a state where the focusing position of the imaging unit is adjusted to the imaging target via an imaging window;

using an image signal evaluator to evaluate a first image signal that is based on the first image, and to calculate a first contrast evaluation value, obtained by evaluating a contrast of the first image signal, and a first focusing degree evaluation value, obtained by evaluating a focusing degree in the imaging unit based on the first image signal;

using a water droplet adhesion determiner to determine that, as a first determination, there is a possibility that a water droplet may be adhering onto the imaging window, in a case where the first contrast evaluation value is smaller than a first threshold value, and the first focusing degree evaluation value is smaller than a second threshold value;

using the focusing position controller to adjust the focusing position of the imaging unit to a position of a close distance in a case where it is determined that there is a possibility that a water droplet may be adhering by the first determination;

using the imaging unit to capture a second image in a state where the focusing position of the imaging unit is adjusted to the position of the close distance;

using the image signal evaluator to evaluate a second image signal that is based on the second image, and to calculate a second contrast evaluation value, obtained by evaluating a contrast of the second image signal, and a second focusing degree evaluation value, obtained by evaluating a focusing degree in the imaging unit based on the second image signal; and using a water droplet adhesion determiner to determine that, as a second determination, a water droplet is adhering onto the imaging window in a case where the second contrast evaluation value is larger than the first contrast evaluation value, and the second focusing degree evaluation value is larger than the first focusing degree evaluation value.

\* \* \* \* \*